United States Patent
Oh et al.

(10) Patent No.: US 10,437,604 B2
(45) Date of Patent: Oct. 8, 2019

(54) ELECTRONIC APPARATUS AND BOOTING METHOD THEREOF

(71) Applicant: SAMSUNG ELECTRONICS CO., LTD., Suwon-si (KR)

(72) Inventors: Surng-Kyo Oh, Anyang-si (KR); Ju-hwan Song, Suwon-si (KR); Hyung-joon Kim, Suwon-si (KR); Bong-won Seo, Suwon-si (KR); Jae-gil Lee, Seoul (KR); Cheul-hee Hahm, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 15/405,821

(22) Filed: Jan. 13, 2017

(65) Prior Publication Data

US 2017/0249158 A1 Aug. 31, 2017

Related U.S. Application Data

(60) Provisional application No. 62/301,184, filed on Feb. 29, 2016.

(30) Foreign Application Priority Data

Jun. 29, 2016 (KR) .................... 10-2016-0081525

(51) Int. Cl.
*G06F 9/4401* (2018.01)
(52) U.S. Cl.
CPC .................... *G06F 9/4405* (2013.01)
(58) Field of Classification Search
CPC .................................................... G06F 9/4405

USPC .................... 701/33.4; 713/2, 1; 717/168
See application file for complete search history.

(56) References Cited

U.S. PATENT DOCUMENTS

| 7,380,140 | B1 * | 5/2008 | Weissman | ............ G06F 21/575 |
| | | | | 709/213 |
| 7,937,198 | B2 * | 5/2011 | Brozovich | ............ G06F 9/4401 |
| | | | | 701/33.4 |
| 9,223,601 | B2 * | 12/2015 | Akiyama | ............ G06F 9/45533 |
| 2008/0127192 | A1 | 5/2008 | Capps et al. | |

(Continued)

FOREIGN PATENT DOCUMENTS

| KR | 100640243 B1 | 11/2006 |
| KR | 1020110095036 A | 8/2011 |

(Continued)

*Primary Examiner* — Aurel Prifti
(74) *Attorney, Agent, or Firm* — Sughrue Mion, PLLC

(57) ABSTRACT

An electronic apparatus and a booting method thereof are provided. The electronic apparatus includes an inputter configured to receive a power-on command, and a memory configured to store task-processing information of tasks for each booting mode. The electronic apparatus further includes a processor configured to, in response to the reception of the power-on command, determine a booting mode, based on use information of the electronic apparatus, determine a priority order and an affinity of each of the tasks for the determined booting mode, based on the task-processing information of the tasks for the determined booting mode, and process the tasks for the determined booting mode, based on the determined priority order and affinity of each of the tasks for the determined booting mode, to boot the electronic apparatus.

18 Claims, 11 Drawing Sheets

(56) References Cited

U.S. PATENT DOCUMENTS

| | | | | |
|---|---|---|---|---|
| 2009/0320012 A1* | 12/2009 | Lee | ............................ | G06F 8/65 |
| | | | | 717/168 |
| 2012/0011354 A1* | 1/2012 | Owen | .................... | G06F 9/4408 |
| | | | | 713/2 |
| 2012/0131321 A1* | 5/2012 | Jitkoff | .................... | G06F 1/3203 |
| | | | | 713/2 |
| 2013/0346736 A1* | 12/2013 | Cook | ..................... | G06F 9/4416 |
| | | | | 713/2 |
| 2014/0040298 A1* | 2/2014 | Iguchi | ................ | G06F 17/30386 |
| | | | | 707/758 |
| 2015/0212825 A1* | 7/2015 | Kim | ....................... | G06F 9/4406 |
| | | | | 713/2 |
| 2015/0339129 A1* | 11/2015 | Divakaran | ............. | G06F 9/4405 |
| | | | | 713/2 |
| 2016/0026503 A1 | 1/2016 | Lim et al. | | |

FOREIGN PATENT DOCUMENTS

| | | | |
|---|---|---|---|
| KR | 1020120127694 A | 11/2012 | |
| KR | 1020150097317 A | 8/2015 | |
| KR | 101588295 B1 | 1/2016 | |

* cited by examiner

FIG. 6B

| TASK-PROCESSING INFORMATION OF INTERNET TV BOOTING MODE |
|---|
| AVOCD Main Task: <br> *Initial priority 10/Affinity 3 |
| TV-viewer Main Task: <br> *Initial priority 10/Affinity 3 <br> *TV Plus Show: priority 20/Affinity 0-3 |
| D-Bus: <br> *Initial priority 80/Affinity 0-3 <br> *DBUS Ready: priority 20/Affinity 0-3 |
| TVS: <br> *Initial priority 20/Affinity 0-3 |
| Connection Manager: <br> *Initial priority 80/Affinity 0-3 <br> *TV Plus Show: priority 20/Affinity 0-3 |
| ... |
| S-Live: <br> *Initial priority 80/Affinity 0-3 <br> *TV Plus Show: priority 20/Affinity 0-3 <br> TV Plus Service: <br> *Initial priority 80/Affinity 0-3 <br> *TV Plus Show: priority 20/Affinity 0-3 |
| ... |
| Others: <br> *Initial priority 10/Affinity 3 <br> *Launcher Show: priority 20/Affinity 0-3 |

| | | | | | | | |
|---|---|---|---|---|---|---|---|
| AVOCD (Main Task) | Priority: 80 / Core: 0 | | | | | | |
| X-server | Priority: 40 / Core: 0-3 | | | | | | |
| TV-viewer (Main Task) | Priority: 10 / Core: 3 | | | | Priority: 20 / Core: 0-3 | | |
| D-Bus | Priority: 80 / Core: 0-3 | Priority: 20 / Core: 0-3 | | | | | |
| TVS | | | Priority: 20 / Core: 0-3 | | | | |
| Connection Manager | | Priority: 80 / Core: 0-3 | | | Priority: 20 / Core: 0-3 | | |
| Window Manager | | Priority: 40 / Core: 0-3 | | Priority: 20 / Core: 0-3 | | | |
| Launcher | | Priority: 10 / Core: 3 | | | | | |
| S-Live provider | | | | Priority: 80 / Core: 0-3 | | Priority: 20 / Core: 0-3 | |
| TV Plus Service | | | | Priority: 80 / Core: 0-3 | | Priority: 20 / Core: 0-3 | |
| Others | | | | | | | Priority: 20 / Core: 0-3 |

Event: D-bus Ready — X-server Ready — Network Ready — AVOCD Ready — Window ready — TV-viewer Ready — Tv Plus Show — Launcher Ready

BOOT PROCESSING TIME →

ELECTRONIC APPARATUS AND BOOTING METHOD THEREOF

CROSS-REFERENCE TO RELATED APPLICATIONS

This application claims priority from U.S. Provisional Application No. 62/301,184, filed in the U.S. Patent and Trademark Office on Feb. 29, 2016, and from Korean Patent Application No. 10-2016-0081525, filed in the Korean Intellectual Property Office on Jun. 29, 2016, the disclosures of which are incorporated herein by reference in their entireties.

BACKGROUND

1. Field

Apparatuses and methods consistent with exemplary embodiments relate to an electronic apparatus and a booting method thereof, and more particularly, to an electronic apparatus that determines a booting mode, according to a use record of the electronic apparatus, and processes a plurality of tasks, according to the determined booting mode, to boot the electronic apparatus, and a booting method thereof.

2. Description of the Related Art

Recently, according to the development of processor technology to improve speed of processing an electronic apparatus, multi-core processors are being produced rather than single-core processors. A multi-core processor can carry out a number of tasks at the same time. A performance of an application of an electronic apparatus in a multi-core processor system environment is much improved than that of an electronic apparatus of a single-core processor system environment. For example, a multi-core processor can load at least two cores or more than two cores and each core can process at least one task. Because each of the cores simultaneously processes at least one task, the electronic apparatus can process a plurality of tasks more efficiently and quickly.

In an existing multi-core processor, an identical priority order is set for all tasks and the tasks are operated with the priority order, or only some tasks are set and processed with fixed different priority orders. In an operating system operated in an existing multi-core processor, all tasks are operated by being assigned in all cores, or some tasks are fixed to a designated core and the tasks are operated.

In an existing apparatus, if all tasks are operated in a condition that each of the tasks has an identical priority order or tasks are operated with respectively designated priority orders, there is a limit in operating each task efficiently. In a booting phase of an electronic apparatus, regardless of an existence of a task that plays a most important role at the stage, tasks are operated with fixed priority orders.

In case of an electronic apparatus such as a smart TV, when a power-on command is input, tasks that play important roles according to previous recorded information (about TV watching) of a user can be flexibly changed, but there is a problem that an existing electronic apparatus cannot efficiently handle the tasks.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide an electronic apparatus that can more efficiently carry out a booting operation by changing priority orders and affinities of a plurality of tasks, according to use record of the electronic apparatus, while the electronic apparatus is being booted, and a booting method thereof.

According to an aspect of an exemplary embodiment, there is provided an electronic apparatus including an inputter configured to receive a power-on command, and a memory configured to store task-processing information of tasks for each booting mode. The electronic apparatus further includes a processor configured to, in response to the reception of the power-on command, determine a booting mode, based on use information of the electronic apparatus, determine a priority order and an affinity of each of the tasks for the determined booting mode, based on the task-processing information of the tasks for the determined booting mode, and process the tasks for the determined booting mode, based on the determined priority order and affinity of each of the tasks for the determined booting mode, to boot the electronic apparatus.

The task-processing information may include information of initial priority orders and initial affinities of the tasks for each booting mode and information of a priority order and an affinity of a task that change in response to an occurrence of an event based on a scenario, for each booting mode.

The processor may be further configured to process the tasks for the determined booting mode, based on the information of the initial priority orders and the initial affinities of the tasks for the determined booting mode, and in response to the occurrence of the event, change the priority order and the affinity of the task for the determined booting mode, based on the information of the priority order and the affinity of the task for the determined booting mode, and process the task for the determined booting mode, based on the changed priority order and affinity.

The use information of the electronic apparatus may include information of a use record before the electronic apparatus was most recently turned off.

The processor may be further configured to, in response to the electronic apparatus providing an image content through an antenna before the electronic apparatus was most recently turned off, determine a booting mode of the electronic apparatus as a first booting mode, and in response to the electronic apparatus providing an image content through an Internet before the electronic apparatus was most recently turned off, determine a booting mode of the electronic apparatus as a second booting mode.

For the first booting mode, priority orders and affinities of tasks that are performed to provide the image content through the antenna, may be higher than priority orders and affinities of other tasks, and for the second booting mode, priority orders and affinities of tasks that are performed to provide the image content through the Internet, may be higher than priority orders and affinities of other tasks.

The use information of the electronic apparatus may include information of a use history of each user.

The inputter may be further configured to detect a user manipulation while the electronic apparatus is being booted, and the processor may be further configured to, in response to the detection of the user manipulation while the electronic apparatus is being booted, determine a task corresponding to the user manipulation, assign a high priority order and a high affinity to the determined task highly, and process the task, based on the assigned high priority order and high affinity.

According to an aspect of an exemplary embodiment, there is provided a booting method of an electronic apparatus, the method including receiving an input of a power-on command, and in response to the reception of the power-on command, determining a booting mode, based on use information of the electronic apparatus. The method further includes determining a priority order and an affinity of each of tasks for the determined booting mode, based on task-processing information of the tasks for the determined booting mode, and process the tasks for the determined booting mode, based on the determined priority order and affinity of each of the tasks for the determined booting mode, to boot the electronic apparatus.

The method may further include storing task-processing information of tasks for each booting mode.

The task-processing information may include information of initial priority orders and initial affinities of the tasks for each booting mode and information of a priority order and an affinity of a task that change in response to an occurrence of an event based on a scenario, for each booting mode.

The processing may include processing the tasks for the determined booting mode, based on the information of the initial priority orders and the initial affinities of the tasks for the determined booting mode, and in response to the occurrence of the event, changing the priority order and the affinity of the task for the determined booting mode, based on the information of the priority order and the affinity of the task for the determined booting mode, and processing the task for the determined booting mode, based on the changed priority order and affinity.

The use information of the electronic apparatus may include information of a use record before the electronic apparatus was most recently turned off.

The determining the booting mode may include, in response to the electronic apparatus providing an image content through an antenna before the electronic apparatus was most recently turned off, determining a booting mode of the electronic apparatus as a first booting mode, and in response to the electronic apparatus providing an image content through an Internet before the electronic apparatus was most recently turned off, determining a booting mode of the electronic apparatus as a second booting mode.

For the first booting mode, priority orders and affinities of tasks that are performed to provide the image content through the antenna, may be higher than priority orders and affinities of other tasks, and for the second booting mode, priority orders and affinities of tasks that are performed to provide the image content through the Internet, may be higher than priority orders and affinities of other tasks.

The use information of the electronic apparatus may include information of a use history of each user.

The method may further include detecting a user manipulation while the electronic apparatus is being booted, and in response to the detection of the user manipulation while the electronic apparatus is being booted, determining a task corresponding to the user manipulation, assigning a high priority order and a high affinity to the determined task highly, and processing the task, based on the assigned high priority order and high affinity.

BRIEF DESCRIPTION OF THE DRAWINGS

The above and/or other aspects will be more apparent by describing exemplary embodiments with reference to the accompanying drawings, in which:

FIG. 6B is a diagram illustrating a method of processing a plurality of tasks, according to an Internet TV booting mode, according to an exemplary embodiment.

DETAILED DESCRIPTION OF THE EXEMPLARY EMBODIMENTS

Figure 1:
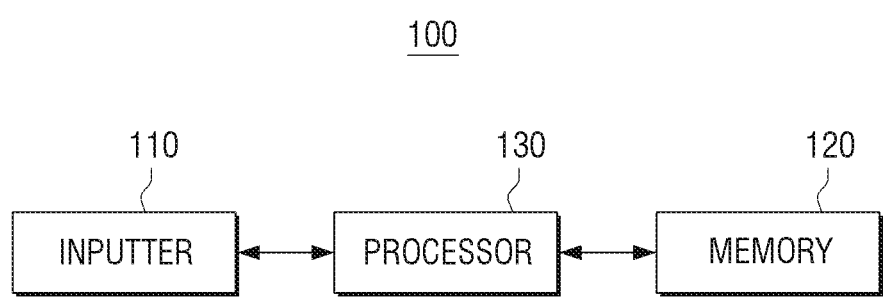
FIG. 1 is a block diagram briefly illustrating a configuration of an electronic apparatus according to an exemplary embodiment.

Terms used in the disclosure will be briefly explained, and exemplary embodiments will now be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

Although the terms used in the disclosure may be general terms that are widely used in the present time considering the functions in the present disclosure, the terms may be changed depending on an intention of a person skilled in the art, a precedent, and introduction of new technology.

In an example embodiment, "a module" or "a unit" performs at least one function or operation, and may be realized as hardware (e.g., circuitry), firmware, software, or combination thereof. Further, a plurality of "modules" or a plurality of "units" are integrated into at least one module except for the "module" or "unit" that is implemented by specific hardware and thus may be implemented by at least one processor.

Expressions such as "include" or "may include" that can be used in exemplary embodiments of the disclosure indicate an existence of a related function, operation or element that is disclosed, and the expressions do not limit an additional function, operation or element. In addition, it may be understood that the terms "include" or "have" used in the exemplary embodiments of the disclosure are to indicate the presence of features, numbers, steps, operations, elements, parts, or a combination thereof described in the specifications, and do not preclude the presence or addition of one or more other features, numbers, steps, operations, elements, parts, or a combination thereof.

Expressions such as "or" in the present disclosure include any or all combinations of words listed together. For example, "A or B" may include A, B, or both A and B.

Expressions of "first," "second," "$1^{st}$", "$2^{nd}$," or the like in the present disclosure may modify various components in the present disclosure but do not limit the corresponding components. For example, the expressions do not limit order and/or importance, or the like of the corresponding components. The expressions may be used to differentiate one component from other components. For example, both of a first user device and a second user device are user devices and represent different user devices. For example, a first element may be named a second element without departing from the scope of right of the exemplary embodiments of the present disclosure, and similarly, a second element may be named a first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The terms used herein are only used to describe an exemplary embodiment, and are not intended to limit the scope of right. Singular forms are intended to include plural forms unless the context clearly indicates otherwise.

All of the terms used herein including technical or scientific terms may have the same meanings as those generally understood by an ordinary skilled person in the related art unless they are defined otherwise. Terms generally used and defined by a dictionary may be interpreted as having the same meanings as meanings within a context of the related art and may not be interpreted as having ideal or excessively formal meanings unless being clearly defined otherwise in the present disclosure.

According to exemplary embodiments, an electronic apparatus may be constituted of a heterogeneous multi-core processor that includes at least two cores that are different from each other. The multi-core processor may be constituted of different logic units among, for example, X86, X64, ARM, GPU, DSP.

In the exemplary embodiments, "a processor" may include at least one core and may be defined as a unit that can be independently connected with other elements of an apparatus.

In the exemplary embodiments, "a core" may be defined as a smallest unit that can execute and process a command in a processor and may be interpreted as the same as "a logic unit."

Hereinafter, an electronic apparatus will be described according to exemplary embodiments by referring to the drawings attached hereto.

FIG. 1 is a block diagram briefly illustrating a configuration of an electronic apparatus 100 according to an exemplary embodiment.

As illustrated in FIG. 1, the electronic apparatus 100 includes an inputter 110, a memory 120 and a processor 130. The display apparatus 100 may be embodied as a television but it only pertains to an exemplary embodiment and may be embodied in various electronic apparatus such as a smartphone, a tablet PC, a laptop, a desk PC, a kiosk, etc.

The inputter 110 receives an input of a user command. The inputter may receive a turn-on command by which the electronic apparatus 100 is turned on.

The memory 120 may store task-processing information regarding a plurality of tasks for each booting mode. Herein, the task-processing information is information in which a priority order and an affinity of a task according to a scenario corresponding to a booting mode are flexibly defined, and may include information about initial priority orders and initial affinities for a plurality of tasks for each booting mode and information about a priority order and an affinity that are changed according to a scenario for each booting mode when an event occurs.

Herein, the task may be a job that is executed with a program area (for example, a code, a stack, etc.). Herein, the task may indicate a process or a program. To execute a function or service, a task may be processed but it only pertains to an exemplary embodiment and to execute a function or a service, a task group including a plurality of tasks may be processed.

Also, when a plurality of tasks are carried out at the same time in a multi-core processor system, priority orders of tasks may indicate scheduled priority orders for the plurality of tasks. The affinity of a task may indicate assigning a core by which a task is carried out among a plurality of cores in the multi-core processor system.

The memory may store use information of the electronic apparatus 100. Herein, use information of the electronic apparatus 100 may be information about use record before the electronic apparatus 100 was most recently turned off or may be information regarding use history of each user.

The processor 130 may control the overall operation of the electronic device 100. The processor 130 may, in response to a power-on command that was input through the inputter 110, determine a booting mode based on the use information of the electronic apparatus 100 and process a plurality of tasks by determining priority orders and affinities for the plurality of tasks to boot the electronic apparatus 100 based on task-processing information corresponding to a determined booting mode.

When the power-on command is input, the processor 130 may determine a booting mode based on information about use record before the electronic apparatus 100 was most recently turned off. For example, if an image content was provided though an antenna before the electronic apparatus 100 was most recently turned off, the processor 130 may determine a booting mode of the electronic apparatus 100 as a first booting mode (for example, an RF booting mode). Herein, the first booting mode may be a mode that provides priority orders and affinities that are higher than priority orders and affinities of other tasks to a plurality of tasks that are performed to provide an image content through the antenna. If an image content was provided through the Internet before the electronic apparatus 100 was most recently turned off, the processor 130 may determine a booting mode of the electronic apparatus 100 as a second booting mode (for example, an Internet TV booting mode). Herein, the second booting mode may be a mode that provides priority orders and affinities that are higher than priority orders and affinities of other tasks to a plurality of tasks that are performed to provide an image content through the Internet. Herein, a task having a high priority order indicates consuming many CPU resources to process the task and a task having a high affinity indicates that the task is assigned to a core with good performance or assigned to a plurality of cores.

The processor 130 may process a plurality of tasks to boot the electronic apparatus 100 by loading task-processing information corresponding to a determined booting mode.

The processor 130 may initially process a plurality tasks based on initial priority orders and initial affinities of the plurality of tasks in task-processing information corresponding to a determined booting mode. The processor 130 may, when an event occurs, change a priority order and an affinity for at least one task among a plurality of tasks according to the occurred event, and then process the task. Herein, the event indicates various situations that occur while a booting operation is being processed and an event is used as an indicator indicating a progress of boot or a booting stage. An example of an event may be a completion of a task's boot and a start of a task.

Figure 2:
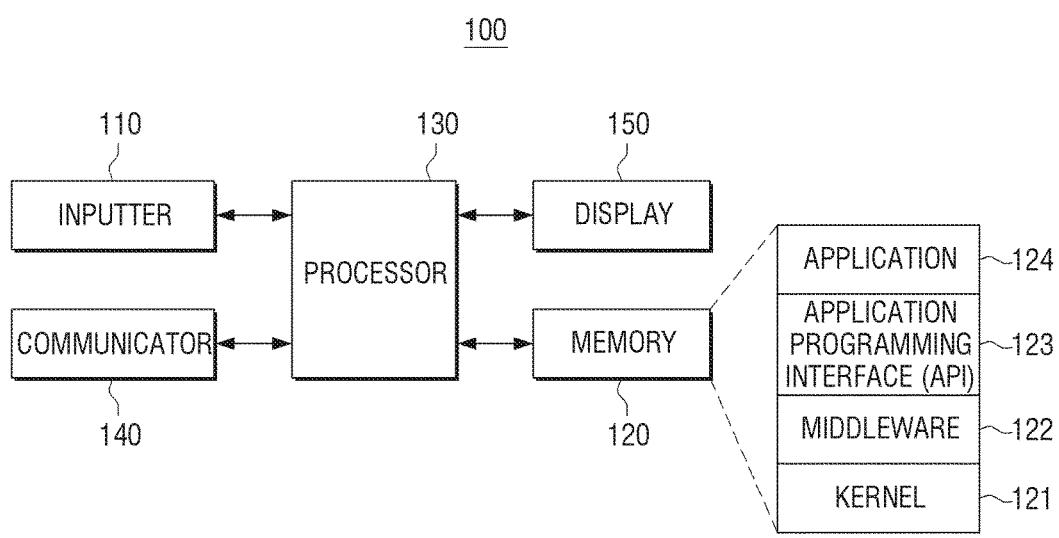
FIG. 2 is a block diagram illustrating a configuration of an electronic apparatus in detail, according to an exemplary embodiment.

FIG. 2 is a block diagram illustrating a configuration of the electronic device 100 in detail, according to an exemplary embodiment.

FIG. 2 illustrates that the electronic apparatus 100 includes the inputter 110, a communicator 140, a display 150, the memory 120 and the processor 130. However, the elements illustrated in FIG. 2 are examples, and the elements are not limited thereto. Any one or any combination of the aforementioned elements may be omitted and another functional unit may be added.

The inputter 110 is configured to receive an input of a user command to control the electronic apparatus 100. The inputter 110 may receive a power-on command to turn on the electronic apparatus 100 in a turned-off condition (in a condition that a standby power is turned on).

Herein, the inputter 110 may be embodied as a remote controller and when the inputter 110 is embodied as a remote controller, the power-on command may be carried out by a user pushing a power button of the remote controller. However, the inputter 110 being embodied as a remote controller only pertains to one exemplary embodiment and the inputter 110 may be embodied as various inputters such as a button, a keyboard, a mouse, a touch panel, a voice inputter, a motion inputter, etc.

The communicator 140 communicates with an external apparatus. The communicator 140 may include various communication chips, e.g., circuitry, such as, for example, a Wi-Fi chip, a Bluetooth chip, a NFC chip, a wireless communication chip, and the like. A Wi-Fi chip, Bluetooth chip, and NFC chip may communicate in a LAN method, Wi-Fi method, Bluetooth method, and NFC method. In the case of using the Wi-Fi chip or the Bluetooth chip, various connection information such as service set identifier (SSID) and a session key may be transmitted/received first for communication connection and then, various information may be transmitted/received. A wireless communication chip may refer, for example, to a chip that communicates according to various communication protocols, such as an IEEE, a ZigBee, a 3rd Generation (3G), a 3rd Generation Partnership (3GP), a Long Term Evolution (LTE), and the like.

The communicator 140 may receive an image content on the Internal through various wireless communication modules. The communicator 140 may receive an image content from an external through an RF antenna.

The display 150 may output various information (for example, multimedia data or text data) to a user. The display 150 may output an image content received through the Internet and output an image content received through the RF antenna.

The memory 120 may store commands or data that are received from the processor 130 or other elements (for example, the inputter 110, the communicator 140, the display 150, etc.) or generated by the processor 130 or other elements.

The memory 120 may, as illustrated in FIG. 2, include programming modules such as a kernel 121, a middleware 122, an application programming interface (API) 123, and an application 124. Each of the described programming modules may be constituted of software, firmware, hardware or a combination of at least two of these.

The kernel 121 may control or manage the other programming modules, for example, system resources (for example, a bus, the processor 130 or the memory 120) that are used in executing an operation or a function that is embodied in the middleware 122, an API 133 or the application 124. The kernel 121 may provide an interface that can control or manage the electronic apparatus 100 by approaching a separate element of the electronic apparatus 100 in the middleware 122, the API 133 or the application 124.

The middleware 122 may play an intermediation role for the API 123 or the application 124 to transceive data by communicating with the kernel 121. In addition, regarding task requests received from the application 124, the middleware 122 may control the task requests (for example, scheduling or load balancing) by using a method such as assigning a priority order by which system resources (for example, the bus, the processor 130, the memory 120, or the like) of the electronic apparatus 100 are used for at least one application among applications (134).

The API 123 is an interface for the application 124 to control a function provided from the kernel 121 or the middleware 122, and may include at least one interface or a function (for example, a command), for example, for a file controlling, a window controlling, an image processing or a text controlling.

The application 124 may include a SMS/MMS application, an e-mail application, a calendar application, an alarm application, a health care application (for example, an application that measures how much a user exercised or measures blood sugar) or an environment protection application (for example, an application that provides information on atmospheric pressure, humidity or temperature).

Figure 3:
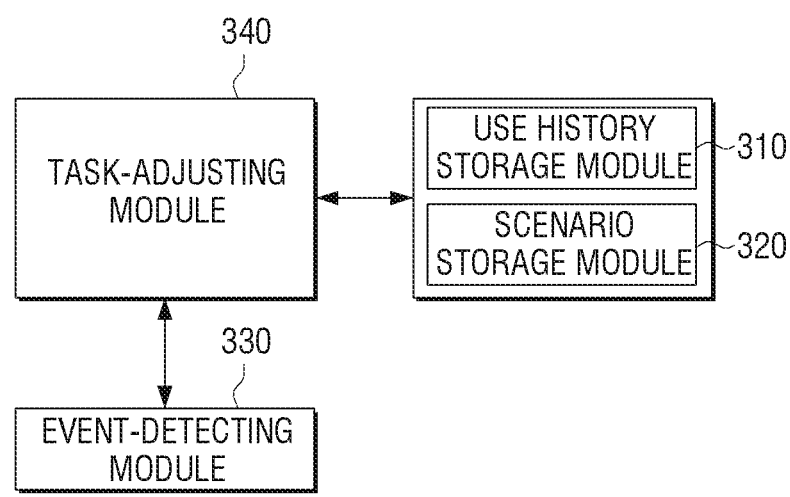
FIG. 3 is a block diagram illustrating a plurality of modules to process a plurality of tasks, according to a booting mode, according to an exemplary embodiment.

FIG. 3 is a block diagram illustrating a plurality of modules to process a plurality of tasks, according to a booting mode, according to an exemplary embodiment.

The memory 120, to execute a task to boot the electronic apparatus 100, as illustrated in FIG. 3, includes use history storage module 310, a scenario storage module 320, an event-detecting module 330 and a task-adjusting module 340.

The use history storage module 310 may store information about use record of a user. The use history storage module 310 may store use information (for example, information on a content that was provided before the electronic apparatus 100 was most recently turned off) before the electronic apparatus 100 was most recently turned off. In addition, the use history storage module 310 may store use history of each user who uses the electronic apparatus 100.

The scenario module 320 stores task-processing information to process a plurality of tasks to correspond to a scenario for each booting mode. Herein, the task-processing information may include information regarding initial priority orders and initial affinities for a plurality of tasks for each booting mode and information regarding a priority order and an affinity that are changed according to a scenario of each booting mode when an event occurs.

The event-detecting module 330 may detect an event that occurs in a process of booting the electronic apparatus 100. For example, the event-detecting module 330 may detect an event that can execute a function by a task being booted.

The task-adjusting module 340 may determine a booting mode based on use information stored in the use history storage module 310. For example, if an image content was provided through the Internet before the electronic apparatus 100 was most recently turned off, the task-adjusting module 340 may determine a booting mode as an Internet TV booting mode.

The task-adjusting module 340 may process a plurality of tasks based on task-processing information corresponding to the Internet TV booting mode. In other words, the task-adjusting module 340 may process a plurality of tasks based on initial priority orders and initial affinities regarding the plurality of tasks stored in the task-processing information and, when an event occurs, the task-adjusting module 340 may flexibly change a priority order and an affinity to correspond to the occurred event and then process a task.

Referring back to FIG. 2, the processor 130 may receive a command from the other elements (for example, the inputter 110, the communicator 140, the display 150 and the memory 120, etc.) through a bus, decode the received command and process an arithmetic operation or data according the decoded command. The processor 130 according to exemplary embodiments may be a multi-core processor.

Hereinafter, a method of the processor 130 booting an electronic apparatus by processing a plurality of tasks according to a booting mode will be described with reference to FIG. 4.

Figure 4:
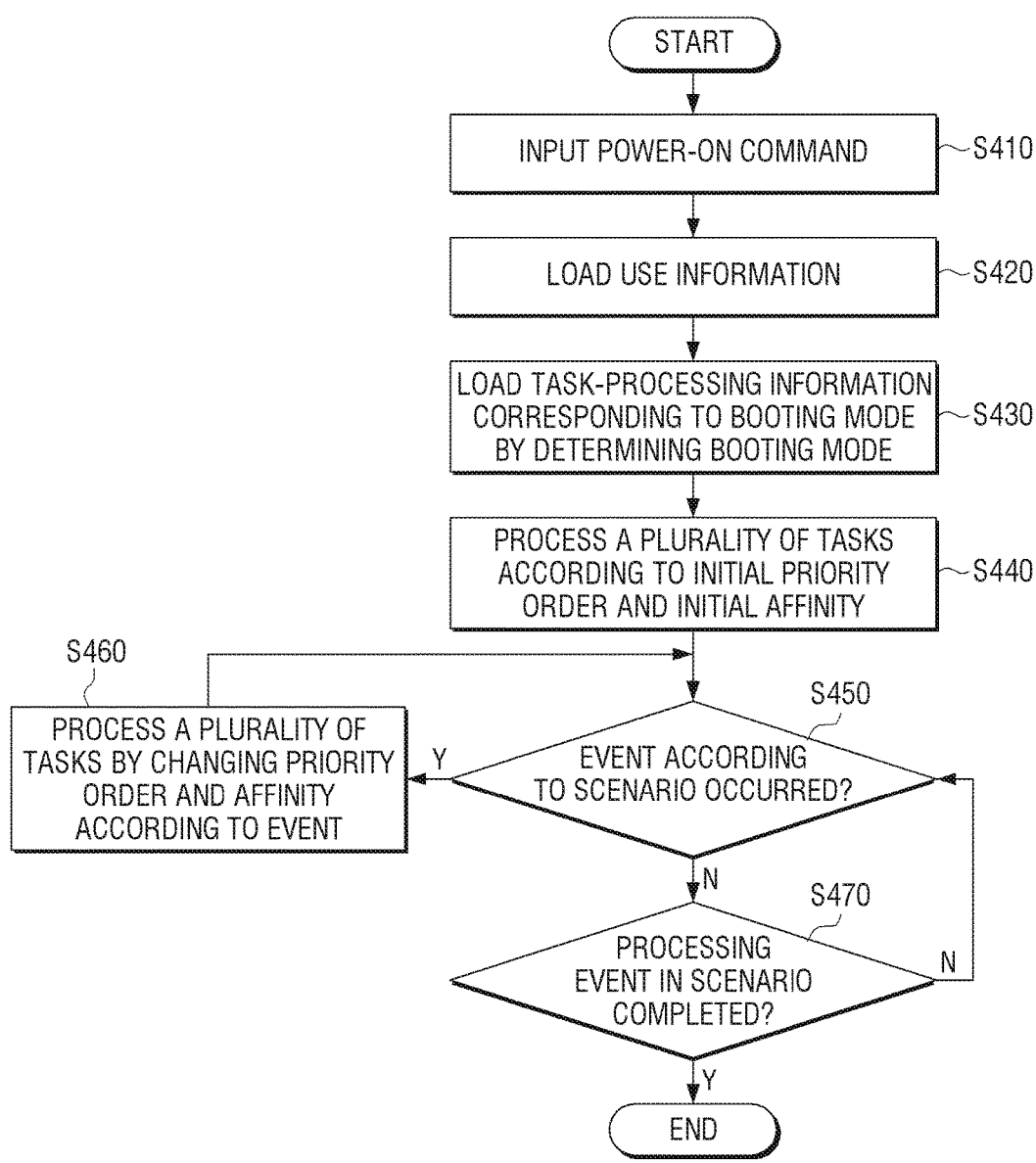
FIG. 4 is a flowchart illustrating a method of booting an electronic apparatus by processing a plurality of tasks, according to a booting mode, according to an exemplary embodiment.

FIG. 4 is a flowchart illustrating a method of booting an electronic apparatus by processing a plurality of tasks, according to a booting mode, according to an exemplary embodiment.

The processor 130 receives an input of a power-on command (S410). Herein, the electronic apparatus 100 is in a power-off condition in which only standby power is input and the processor 130 may execute a turn-on operation for an element of the electronic apparatus 100 though the power-on command.

The processor 130 loads use information (S420). The processor 130 may load information about a content that the electronic apparatus 100 provided before the electronic apparatus was most recently turned off.

The processor 130 loads task-processing information corresponding to a booting mode by determining the booting mode based on use information (S430). For example, if the processor 130 determines a booting mode as a first booting mode based on the use information, the processor 130 may load task-processing information corresponding to the first booting mode and, if the processor 130 determines a booting mode as a second booting mode based on the use information, the processor 130 may load task-processing information corresponding to the second booting mode.

The processor 130 processes a plurality of tasks according to initial priority orders and at least one initial affinity stored in determined task-processing information (S440).

The processor 130 determines whether an event according to a scenario of the determined booting mode occurred (S450).

When an event according to a scenario has been occurred (S450-Y), the processor 130 processes a plurality of tasks by changing at least one priority order and at least one affinity according to the occurred event based on the task-processing information (S460).

When an event according to a scenario does not occur (S450-N), the processor 130 determines whether all processing events in the scenario have been completed (S470).

If all of the events in the scenario have been completed (S470-Y), the processor 130 may determine that a booting operation of the electronic apparatus 100 is completed. However, if all of the events in the scenario has not been completed (S470-N), the processor 130 determines again whether an event according to the scenario has occurred (S450).

Figure 5A:
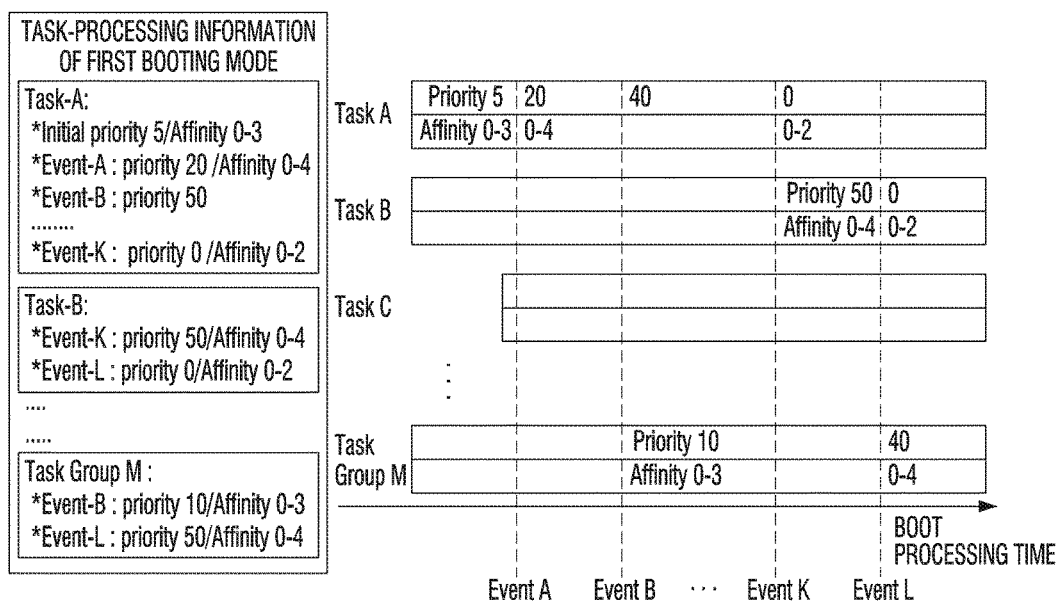
FIGS. 5A and 5B are diagrams illustrating methods of processing a plurality of tasks, according to task-processing information and booting modes, according to an exemplary embodiment.
Figure 5B:
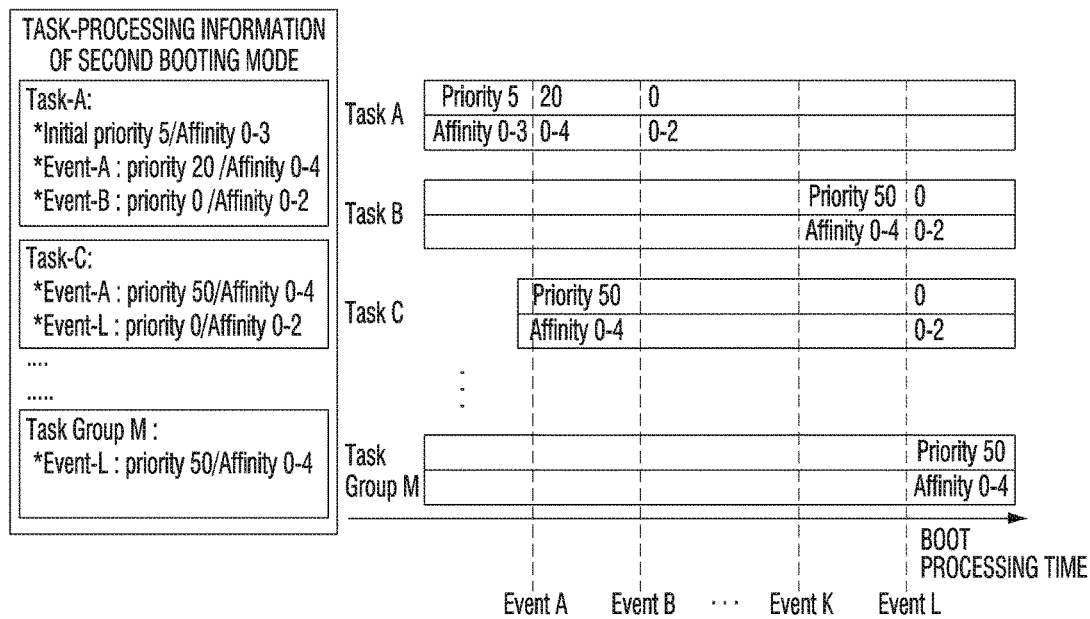

FIGS. 5A and 5B are diagrams illustrating methods of processing a plurality of tasks, according to task-processing information and booting modes, according to an exemplary embodiment.

The left view of FIG. 5A illustrates task-processing information of a first booting mode. As illustrated in the left view of FIG. 5A, the task-processing information of the first booting mode may include information on an initial priority order and an initial affinity of each of a plurality of tasks.

For example, a first booting mode may include task A, task B . . . , and task group M. Herein, task A may be processed with an initial priority order of 5 and an initial affinity of 0-3. When even A occurs, the priority of task A may be changed to 20 and the affinity may be changed to 0-4 and then task A may be processed. When event B occurs, the priority order of task A may be changed to 40 and then processed. When event K occurs, the priority order of task A may be changed to 0 and the affinity may be changed to 0-2 and then task A may be processed. Task B starts to be processed when event k occurs and task B may be processed with a priority order of 50 and an affinity of 0-4. When event L occurs, the priority order of event B may be changed to 0 and the affinity may be changed to 0-2, and then event B may be processed. Task group M starts to be processed when event B occurs and may be processed with a priority order of 10 and an affinity of 0-3. When event L occurs, the priority order of event B may be changed to 50 and the affinity may be changed to 0-2, and then event B may be processed.

In other words, if task-processing information is illustrated in a time scale as illustrated on the left side view of FIG. 5A, a plurality of tasks may be processed in a scenario corresponding to a first booting mode as illustrated on the right side view of FIG. 5A.

The left side view of FIG. 5B illustrates task-processing information of a second booting mode. As illustrated on the left view of FIG. 5B, information on each initial priority order and each initial affinity of a plurality of tasks may be stored in task-processing information of the second booting mode.

For example, the second booting mode may include task A, task C, . . . , task group M. Herein, task A may be processed with an initial priority order of 5 and an initial affinity of 0-3. When event A occurs, the priority order of task A may be changed to 20 and the affinity of task A may be changed to 0-4 and then task A may be processed. When event B occurs, the priority order of task A may be changed to 0 and the affinity of task A may be changed to 0-2 and then task A may be processed. Task C starts to be processed when event A occurs and task C may be processed with a priority order of 50 and an affinity of 0-4. When event L occurs, the priority order of event C may be changed to 0 and the affinity may be changed to 0-2 and then, event C may be processed.

Task group M starts to be processed when event L occurs and may be processed with a priority order of 50 and an affinity of 0-4.

In other words, if task-processing information is illustrated in a time scale as illustrated on the left side view of FIG. 5B, a plurality of tasks may be processed in a scenario corresponding to the second booting mode as illustrated on the right side view of FIG. 5B.

Figure 6A:
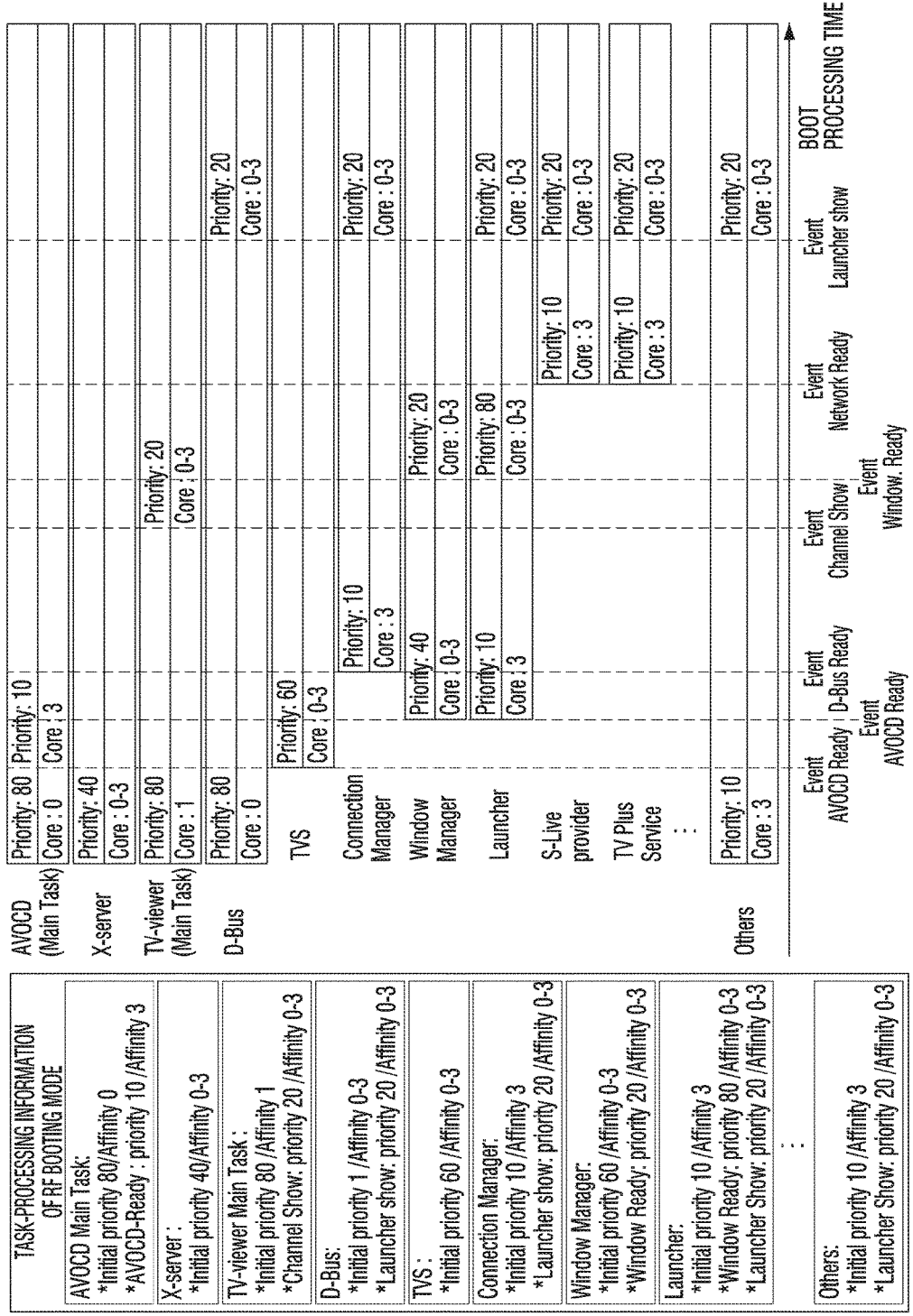
FIG. 6A is a diagram illustrating a method of processing a plurality of tasks, according to an RF booting mode, according to an exemplary embodiment.

FIG. 6A is a diagram illustrating a method of processing a plurality of tasks, according to an RF booting mode, according to an exemplary embodiment.

When use information that an image content was provided through an antenna before the electronic apparatus 100 was most recently turned off is stored, the electronic apparatus 100 may determine a booting mode as the RF booting mode. Herein, the RF booting mode is a mode that provides priority orders and affinities that are higher than priority orders and affinities of other tasks to a plurality of tasks that are performed to provide an image content through the antenna.

The electronic apparatus 100 may load task-processing information of the RF booting mode as illustrated in the left side view of FIG. 6A. Herein, in the RF booting mode, to provide an image content through the antenna, functions of a channel show, a channel conversion and a launcher indication may be performed.

For a quick channel show, the electronic apparatus 100 may quickly boot TV-viewer task. Therefore, the electronic apparatus 100 may process the TV-viewer task with a high initial priority order and a high affinity. The electronic apparatus 100 may quickly boot Tunnel Vision System (TVS) task for a channel conversion and may quickly boot AVOCD task to boot the TVS task. Therefore, the electronic apparatus 100 may process the AVOCD task with a high initial priority order and a high initial affinity. When AVOCD Ready event occurs, the electronic apparatus 100 may lower a priority order of the AVOCD task and process the TVS task with a high priority order and a high affinity. The electronic apparatus 100 may quickly boot the launcher task for the launcher indicating function. Therefore, as described above, the electronic apparatus 100 may process Window manger task and X-server task with high priority orders and high affinities and then process the launcher task with a high priority order and a high affinity.

In other words, when the electronic apparatus 100 is booted in the RF booting mode, as illustrated in the right side view of FIG. 6A, the electronic apparatus 100 may process tasks (for example, the AVOCD task, the TV-viewer task, the X-server task, the TVS task and the like) to quickly provide an image content that is provided through an antenna prior to other tasks.

FIG. 6B is a diagram illustrating a method of processing a plurality of tasks, according to an Internet TV booting mode, according to an exemplary embodiment.

When use information that an image content was provided through the Internet before the electronic apparatus 100 was most recently turned off is stored, the electronic apparatus 100 may determine a booting mode as the Internet TV booting mode. Herein, the Internet TV booting mode is a mode that provides priority orders and affinities that are higher than priority orders and affinities of other tasks to a plurality of tasks that are performed to provide an image content through the Internet.

As illustrated in the left side view of FIG. 6B, the electronic apparatus 100 may load task-processing information of the Internet TV booting mode. Herein, in the Internet TV booting mode, to provide an image content through the Internet, a function of indicating TV PLUS (Internet TV) may be performed.

The electronic apparatus 100 may quickly boot S-Live task and TV Plus service task for the function of quickly indicating TV PLUS. Herein, to quickly boot the S-Live task and the TV Plus service task, the electronic apparatus 100 may quickly boot Connection Manager task and, to quickly boot the Connection Manager task, the electronic apparatus 100 may quickly boot D-BUS task. Therefore, the electronic apparatus 100 may process the D-BUS with a high initial priority order and a high initial affinity. When a D-BUS ready event occurs, the electronic apparatus 100 may process the Connection Manager task with a high priority order and a high affinity. When a Network ready event occurs, the electronic apparatus 100 may process the S-Live task and the TV Plus service task with high priority orders and high affinities.

In other words, when the electronic apparatus 100 is booted in the Internet TV booting mode, as illustrated in the right side view of FIG. 6A, the electronic apparatus 100 may process tasks (for example, the D-BUS task, the Connection Manager task, the S-Live task, the TV Plus service task and the like) to more quickly provide an image content that is provided through the Internet prior to other tasks.

As a result, comparing FIG. 6A with FIG. 6B, kinds of tasks to which higher priority orders and higher affinities are provided are different according to a booting mode. It is because tasks that are performed to provide an image content differ in each booting mode. Therefore, by flexibly changing and applying priority orders and affinities for a plurality of tasks based on scenarios that are different according to a booting mode, the electronic apparatus 100 may carry out a booting operation more quickly.

Figure 7:
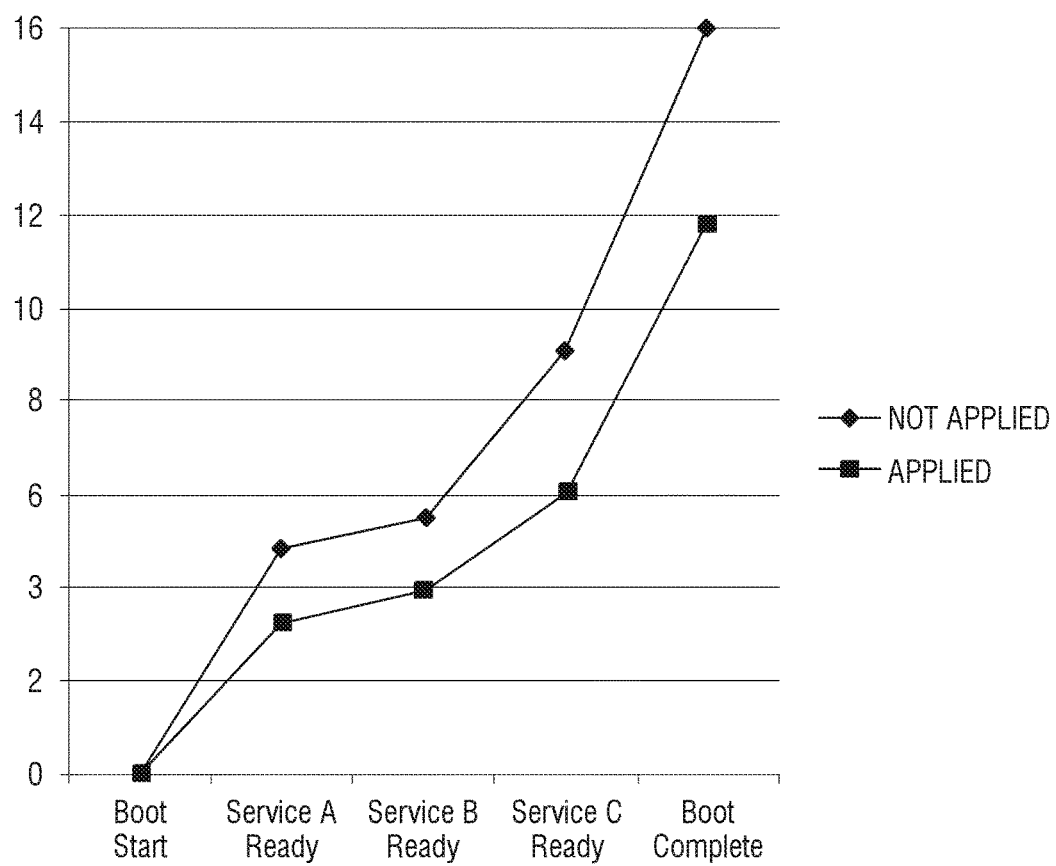
FIG. 7 is a graph illustrating an improvement in booting speed, according to an exemplary embodiment.

FIG. 7 is a graph illustrating an improvement in booting speed, according to an exemplary embodiment.

FIG. 7 illustrates that the electronic apparatus 100 in which the present disclosure has been applied more quickly completes a booting operation because a booting time which is taken in providing each service gets shorter than existing booting time.

In the above exemplary embodiment, it is described that there are RF booting mode and the Internet TV booting mode for a booting mode but it only pertains to an example, and the technical idea of the present disclosure can be applied to various booting modes (for example, a HDMI booting mode in which a content is received through a HDMI terminal from an external apparatus, an application booting mode that executes an application, and the like).

In the above exemplary embodiment, it is described that use information is use information of the electronic apparatus 100 before the electronic apparatus 100 was most recently turned off, but it only pertains to an exemplary embodiment and the use information may be use information of each user. When a first user inputs a power-on command for the electronic apparatus 100, the electronic apparatus 100 may determine a booting mode to provide a content that the first user frequently uses based on use information on the first user. For example, if the first user frequently watches Internet TV programs, the electronic apparatus 100 may determine a booting mode of the electronic apparatus 100 as the Internet TV booting mode based on the use information on the first user and operate in the Internet TV booting mode. For another example, if a second user frequently watches ground-wave programs and cable TV programs, the electronic apparatus 100 may determine a booting mode of the electronic apparatus 100 as an RF booting mode based on use information on the second user. If use information is use information of each user, the electronic apparatus 100 may include an element that can recognize a user who inputs a power-on command.

Figure 8:
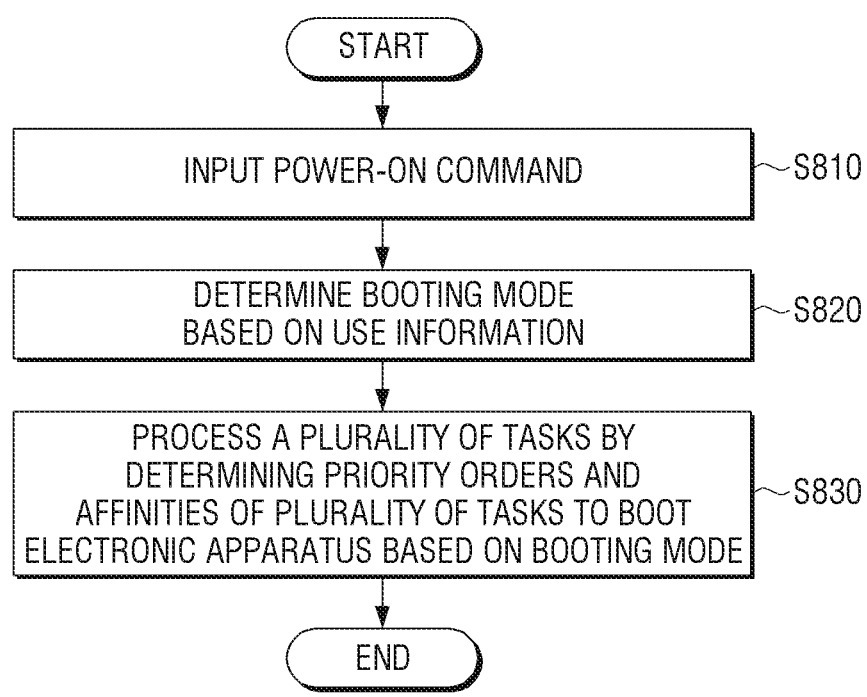
FIG. 8 is a flowchart illustrating a booting method of an electronic apparatus, according to an exemplary embodiment.

FIG. 8 is a flowchart illustrating a booting method of an electronic apparatus, according to an exemplary embodiment.

The electronic apparatus 100 receives an input of a power-on command (S810).

The electronic apparatus 100 determines a booting mode based on use information (S820). Herein, the use information may be use information before the electronic apparatus 100 was most recently turned off or use information of each user.

The electronic apparatus 100 determines priority orders and affinities of a plurality of tasks to boot the electronic apparatus 100 based on the booting mode, and processes the plurality of tasks (S830). Herein, the electronic apparatus 100 may process the plurality of tasks based on initial priority orders and initial affinities according to a booting mode, and when an event occurs, the electronic apparatus 100 may change priority orders and affinities according to the occurred event and flexibly process the plurality of tasks.

According to the exemplary embodiment, the electronic apparatus 100 may shorten a booting time by carrying out a booting operation more efficiently.

Figure 9:
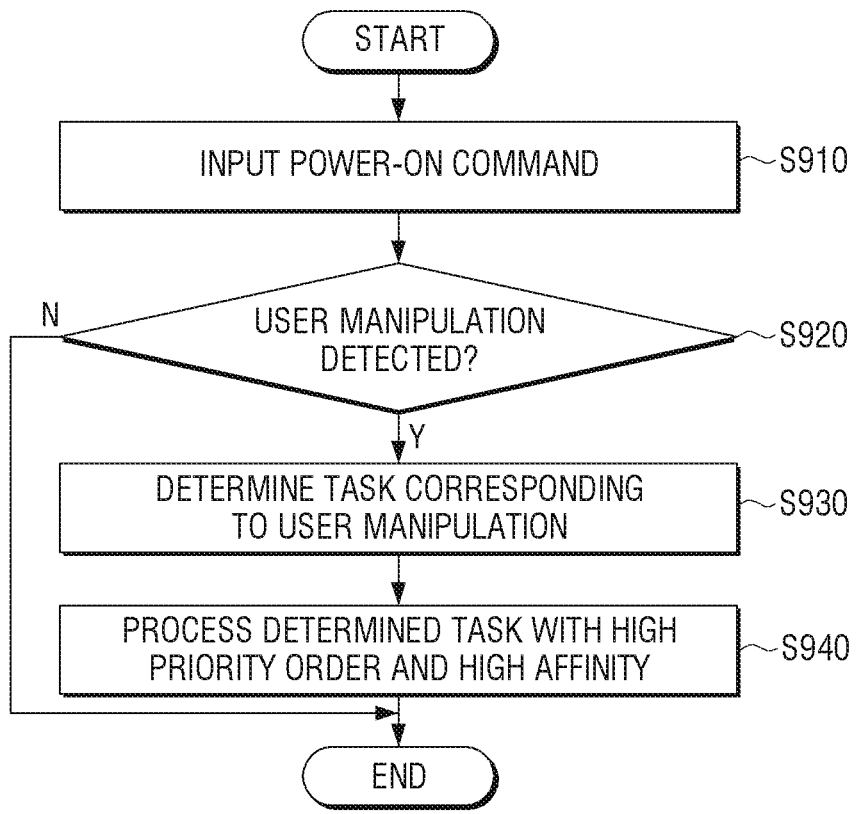
FIG. 9 is a flowchart illustrating a method of processing a task by changing a priority order and an affinity of the task, according to a user manipulation, according to another exemplary embodiment.

FIG. 9 is a flowchart illustrating for a method of processing a task by changing a priority order and an affinity of the task, according to a user manipulation, according to another exemplary embodiment.

The electronic apparatus 100 receives an input of a power-on command (S910). The electronic apparatus 100 carries out a booting process in response to the power-on command. Herein, the electronic apparatus 100 may determine a booting mode according to recorded information for use, determine priority orders and affinities of a plurality of tasks to boot the electronic apparatus 100 based on the booting mode and process the plurality of tasks.

The electronic apparatus 100 determines whether a user manipulation is detected while the booting processing is being carried out (S920). Herein, the user manipulation may be a user manipulation to operate a function of the electronic apparatus 100. For example, the user manipulation may include a user manipulation of changing a channel, a user manipulation to execute an application and the like.

When a user manipulation is detected, the electronic apparatus 100 may determine a task corresponding to the user manipulation (S930). When the user manipulation is detected, the electronic apparatus 100 may determine whether a task corresponding to the user manipulation exists or not. For example, when a user manipulation to change a channel is detected while a booting operation is being carried out, the electronic apparatus 100 may determine a task (for example, the TV-viewer task, the AVOCD task, the TVS task and the like) that is performed for a user to watch an image content through an antenna as a task corresponding to the user manipulation. For another example, when a user manipulation for watching an Internet TV while a booting operation is being carried out is detected, the electronic apparatus 100 may determine a task (for example, the S-Live task, the TV Plus service task and the like) that is performed for a user to watch an image content through the Internet as a task corresponding to the user manipulation.

The electronic apparatus 100 processes the determined task with a high priority order and a high affinity (S940). In other words, the electronic apparatus 100 may, to process a task corresponding to a user manipulation, process the determined task with a high priority order and a high affinity. For example, when a user manipulation for changing a channel is detected while the electronic apparatus 100 is booted in the Internet TV booting mode, the electronic apparatus 100 may determine a task that is performed for a user to watch an image content through the antenna by the task corresponding to the user manipulation for changing a channel, and may highly change an initial priority order and an initial affinity of the task that is performed for a user to watch the image content through the antenna and then process the task. Herein, the electronic apparatus 100 may lower an existing priority order and an existing affinity of a task that is performed for a user to watch an image content through the Internet and then process the task.

According to the exemplary embodiment, the electronic apparatus 100 may shorten a booting time by processing a task corresponding to a user manipulation.

A booting method of the electronic apparatus according to the exemplary embodiments may be embodied as a program and be provided to a display apparatus or an input apparatus. A program including a controlling method of a display apparatus may be stored in a non-transitory computer readable medium and then be provided.

The non-transitory recordable medium refers to a medium that may store data semi-permanently rather than storing data for a short time, such as register, cache, memory, etc. and is readable by an apparatus. The above-described various applications and programs may be stored and provided in a non-transitory recordable medium such as compact disc (CD), digital versatile disc (DVD), hard disk, Blu-ray disk, universal serial bus (USB), memory card, ROM, etc.

While the present disclosure has been shown and described with reference to exemplary embodiments thereof, it will be understood by those skilled in the art that various changes in forms and in details may be made therein without departing from the spirit and scope of the present disclosure as defined by the appended claims and their equivalents.

What is claimed is:

1. An electronic apparatus comprising:
    an inputter configured to receive a power-on command;
    a memory configured to store task-processing information of tasks for each booting mode; and
    a processor configured to, based on the reception of the power-on command:
        determine a user associated with the power-on command from among a plurality of users;
        determine a booting mode, based on use information of the electronic apparatus, wherein the use information corresponds to the determined user;
        determine a priority order and an affinity of each of the tasks for the determined booting mode, based on the task-processing information of the tasks for the determined booting mode; and
        process the tasks for the determined booting mode, based on the determined priority order and affinity of each of the tasks for the determined booting mode, to boot the electronic apparatus.

2. The apparatus as claimed in claim 1, wherein the task-processing information comprises information of initial priority orders and initial affinities of the tasks for each booting mode and information of a priority order and an affinity of a task that change based on an occurrence of an event based on a scenario, for each booting mode.

3. The apparatus as claimed in claim 2, wherein the processor is further configured to:

process the tasks for the determined booting mode, based on the information of the initial priority orders and the initial affinities of the tasks for the determined booting mode; and based on the occurrence of the event, change the priority order and the affinity of the task for the determined booting mode, based on the information of the priority order and the affinity of the task for the determined booting mode, and process the task for the determined booting mode, based on the changed priority order and affinity.

4. The apparatus as claimed in claim 1, wherein the use information of the electronic apparatus comprises information of a use record before the electronic apparatus was most recently turned off.

5. The apparatus as claimed in claim 4, wherein the processor is further configured to:

based on the electronic apparatus providing an image content through an antenna before the electronic apparatus was most recently turned off, determine a booting mode of the electronic apparatus as a first booting mode; and based on the electronic apparatus providing an image content through an Internet before the electronic apparatus was most recently turned off, determine a booting mode of the electronic apparatus as a second booting mode.

6. The apparatus as claimed in claim 5, wherein, for the first booting mode, priority orders and affinities of tasks that are performed to provide the image content through the antenna, are higher than priority orders and affinities of other tasks, and for the second booting mode, priority orders and affinities of tasks that are performed to provide the image content through the Internet, are higher than priority orders and affinities of other tasks.

7. The apparatus as claimed in claim 1, wherein the use information of the electronic apparatus comprises information of a use history of each user.

8. The apparatus as claimed in claim 1, wherein the inputter is further configured to detect a user manipulation while the electronic apparatus is being booted, and the processor is further configured to, based on the detection of the user manipulation while the electronic apparatus is being booted:
determine a task corresponding to the user manipulation;
assign a high priority order and a high affinity to the determined task highly; and
process the task, based on the assigned high priority order and high affinity.

9. The apparatus as claimed in claim 1, wherein the use information of the electronic apparatus comprises first use information of a first user and second use information of a second user, wherein based on the user being determined to be the first user, the booting mode is determined based on the first use information, and wherein based on the user being determined to be the second user, the booting mode is determined based on the second use information.

10. A booting method of an electronic apparatus, the method comprising:
receiving an input of a power-on command;
based on the reception of the power on command, command:

determining a user associated with the power-on command from among a plurality of users;
determining a booting mode, based on use information of the electronic apparatus, wherein the use information corresponds to the determined user;
determining a priority order and an affinity of each of tasks for the determined booting mode, based on task-processing information of the tasks for the determined booting mode; and
processing the tasks for the determined booting mode, based on the determined priority order and affinity of each of the tasks for the determined booting mode, to boot the electronic apparatus.

11. The method as claimed in claim 10, further comprising storing task-processing information of tasks for each booting mode.

12. The method as claimed in claim 11, wherein the use information of the electronic apparatus comprises information of a use history of each user.

13. The method as claimed in claim 11, wherein the task-processing information comprises information of initial priority orders and initial affinities of the tasks for each booting mode and information of a priority order and an affinity of a task that change based on an occurrence of an event based on a scenario, for each booting mode.

14. The method as claimed in claim 13, wherein the processing comprises:
processing the tasks for the determined booting mode, based on the information of the initial priority orders and the initial affinities of the tasks for the determined booting mode; and
based on the occurrence of the event, changing the priority order and the affinity of the task for the determined booting mode, based on the information of the priority order and the affinity of the task for the determined booting mode, and processing the task for the determined booting mode, based on the changed priority order and affinity.

15. The method as claimed in claim 10, wherein the use information of the electronic apparatus comprises information of a use record before the electronic apparatus was most recently turned off.

16. The method as claimed in claim 15, wherein the determining the booting mode comprises:
based on the electronic apparatus providing an image content through an antenna before the electronic apparatus was most recently turned off, determining a booting mode of the electronic apparatus as a first booting mode; and
based on the electronic apparatus providing an image content through an Internet before the electronic apparatus was most recently turned off, determining a booting mode of the electronic apparatus as a second booting mode.

17. The method as claimed in claim 16, wherein, for the first booting mode, priority orders and affinities of tasks that are performed to provide the image content through the antenna, are higher than priority orders and affinities of other tasks, and for the second booting mode, priority orders and affinities of tasks that are performed to provide the image content through the Internet, are higher than priority orders and affinities of other tasks.

18. The method as claimed in claim 10, further comprising:
detecting a user manipulation while the electronic apparatus is being booted; and based on the detection of the user manipulation while the electronic apparatus is being booted:
  determining a task corresponding to the user manipulation;
  assigning a high priority order and a high affinity to the determined task highly; and
  processing the task, based on the assigned high priority order and high affinity.

* * * * *